March 19, 1935.  D. H. N. MAYO  1,995,034
BOILER FURNACE
Filed Oct. 16, 1930  6 Sheets-Sheet 1

INVENTOR
Dana H. N. Mayo
BY
Gifford, Scull & Burgess
ATTORNEYS

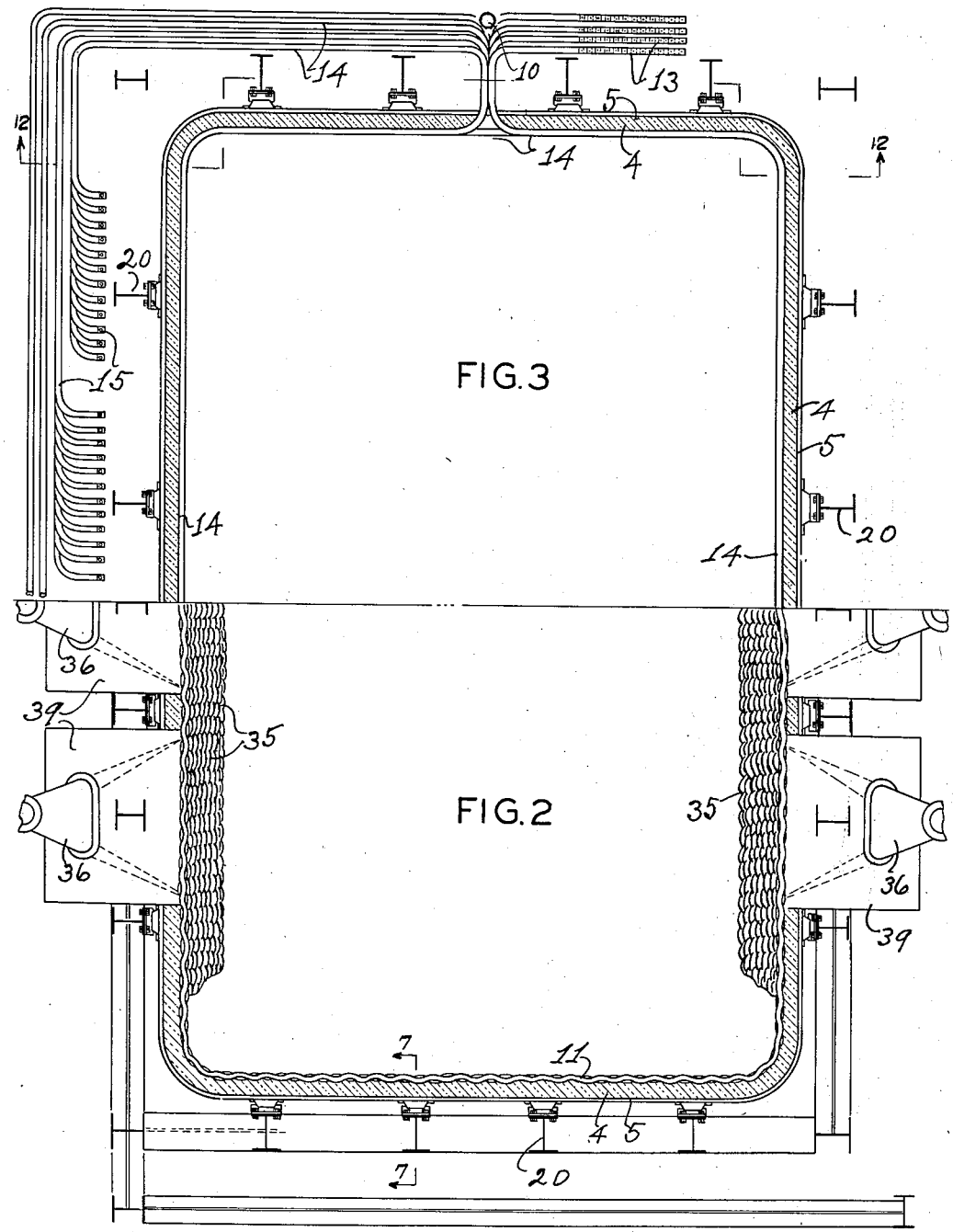

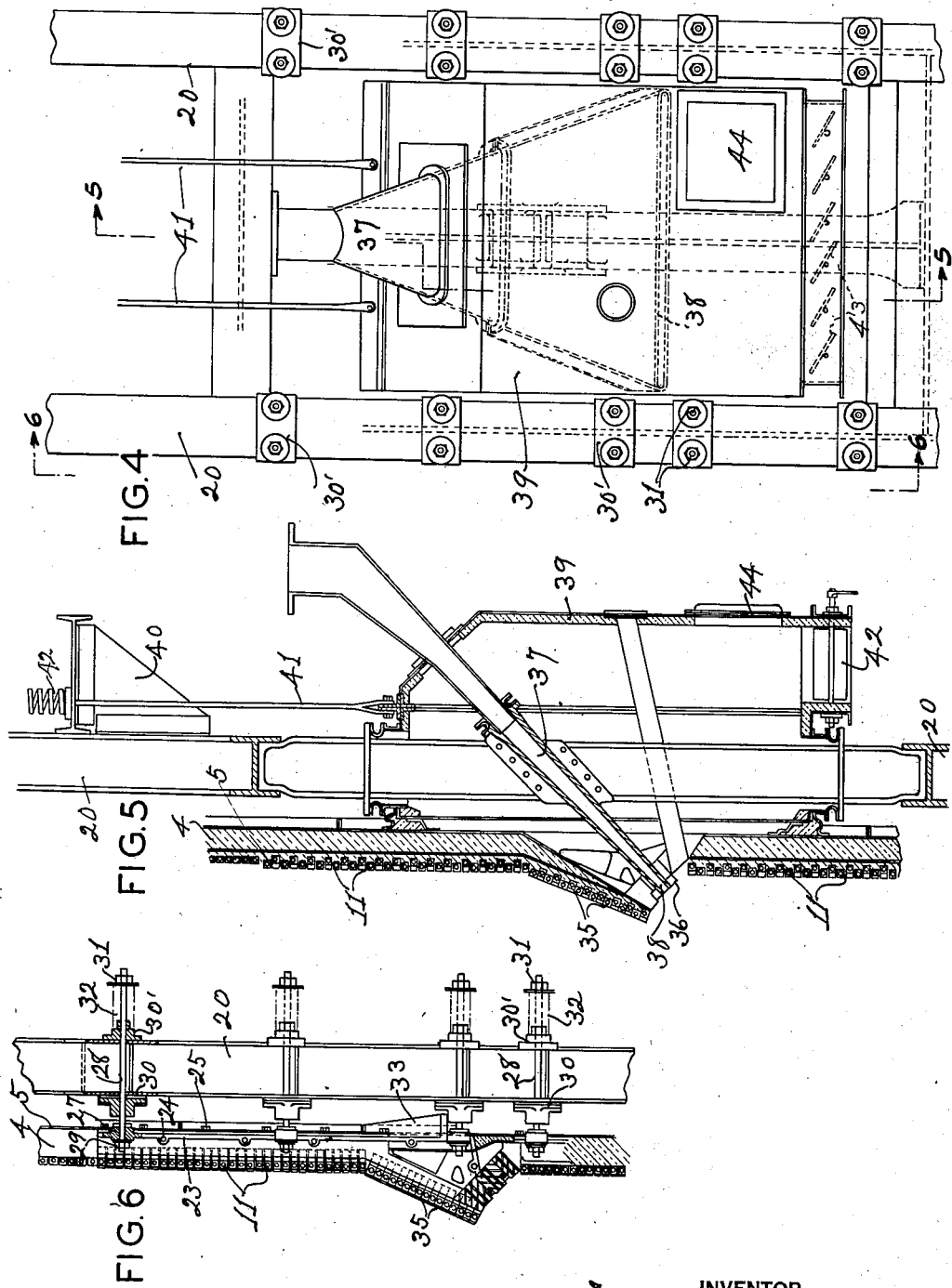

March 19, 1935. D. H. N. MAYO 1,995,034
BOILER FURNACE
Filed Oct. 16, 1930 6 Sheets-Sheet 4
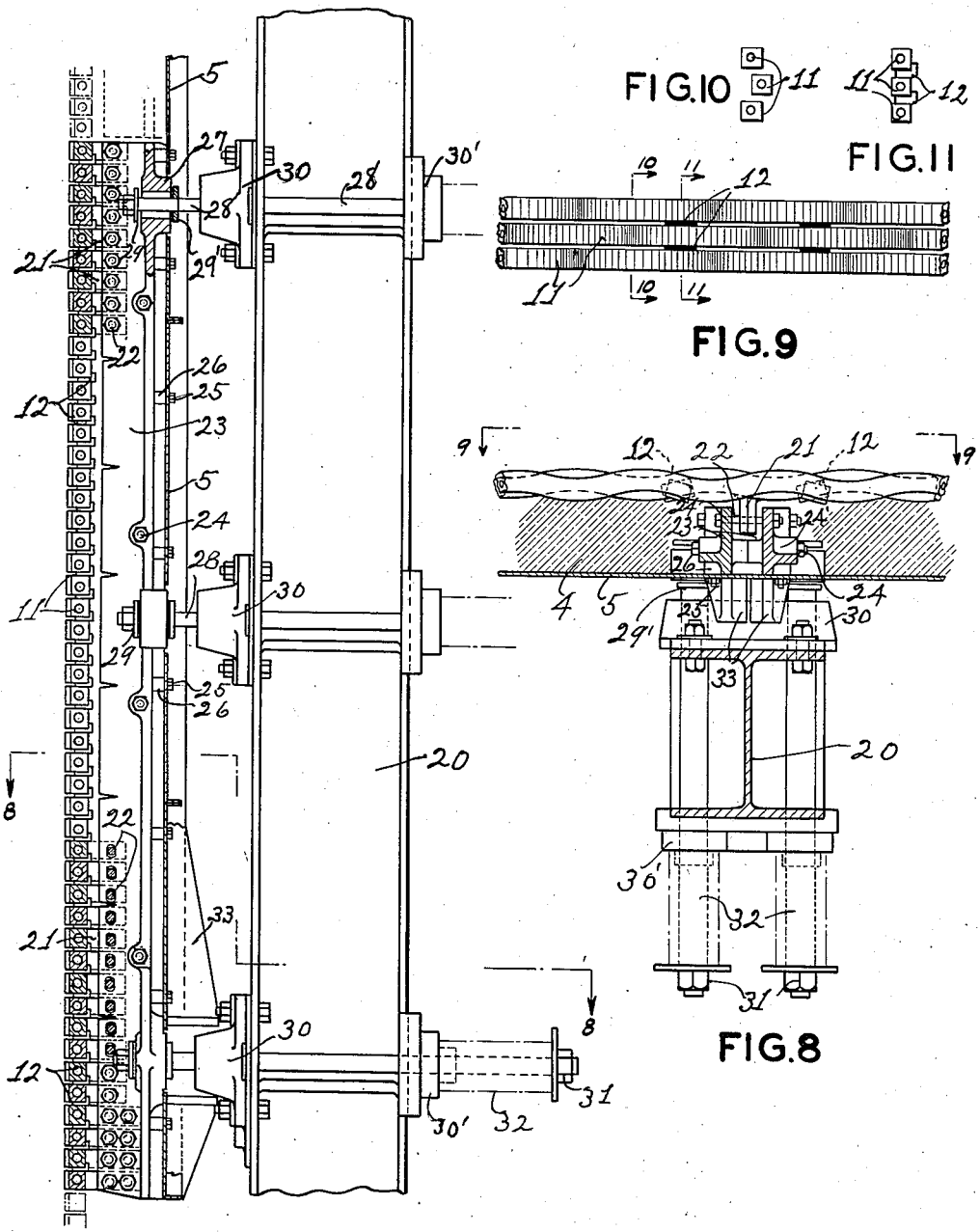
INVENTOR
Dana H. N. Mayo
BY
Gifford, Sueel & Burgess
ATTORNEYS Patented Mar. 19, 1935

1,995,034

UNITED STATES PATENT OFFICE 1,995,034

BOILER FURNACE

Dana H. N. Mayo, Bethlehem, Pa., assignor to Fuller Lehigh Company, Fullerton, Pa., a corporation of Delaware Application October 16, 1930, Serial No. 489,066

21 Claims. (Cl. 122—235)

This invention relates to a boiler furnace having horizontally disposed water tubes along the walls of the furnace with fuel burners for projecting fuel in a downward direction into the furnace between some of the tubes. The invention is especially useful as a high pressure boiler, say, 2500 pounds, in which there is forced circulation through furnace wall tubes. The tubes may be connected in parallel groups with tubes along the upper portion of the furnace lying in the same vertical plane, while the tubes in the lower portion of the furnace are sinuous with the sinuosities staggered.

Figure 1:
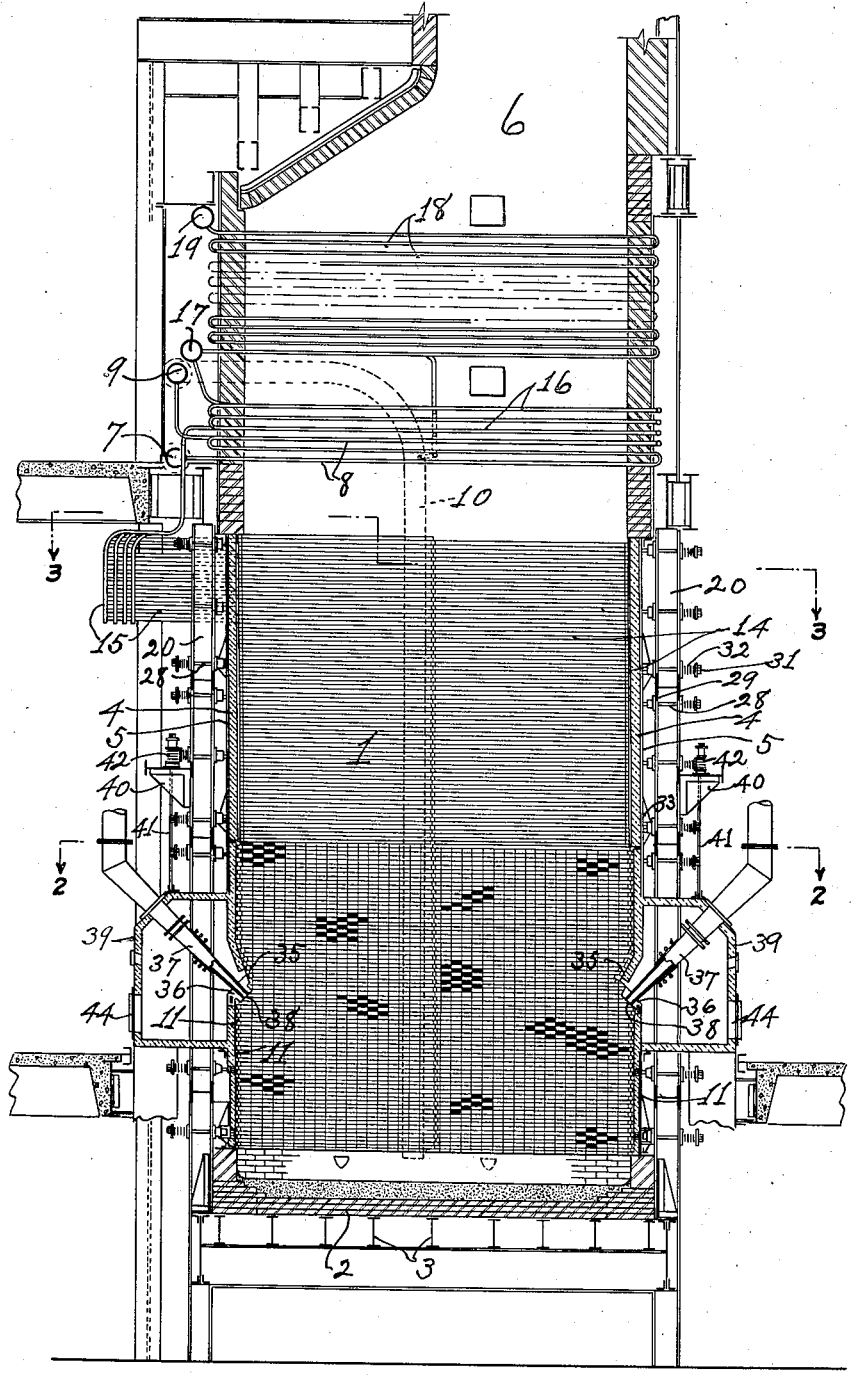
Figure 12:
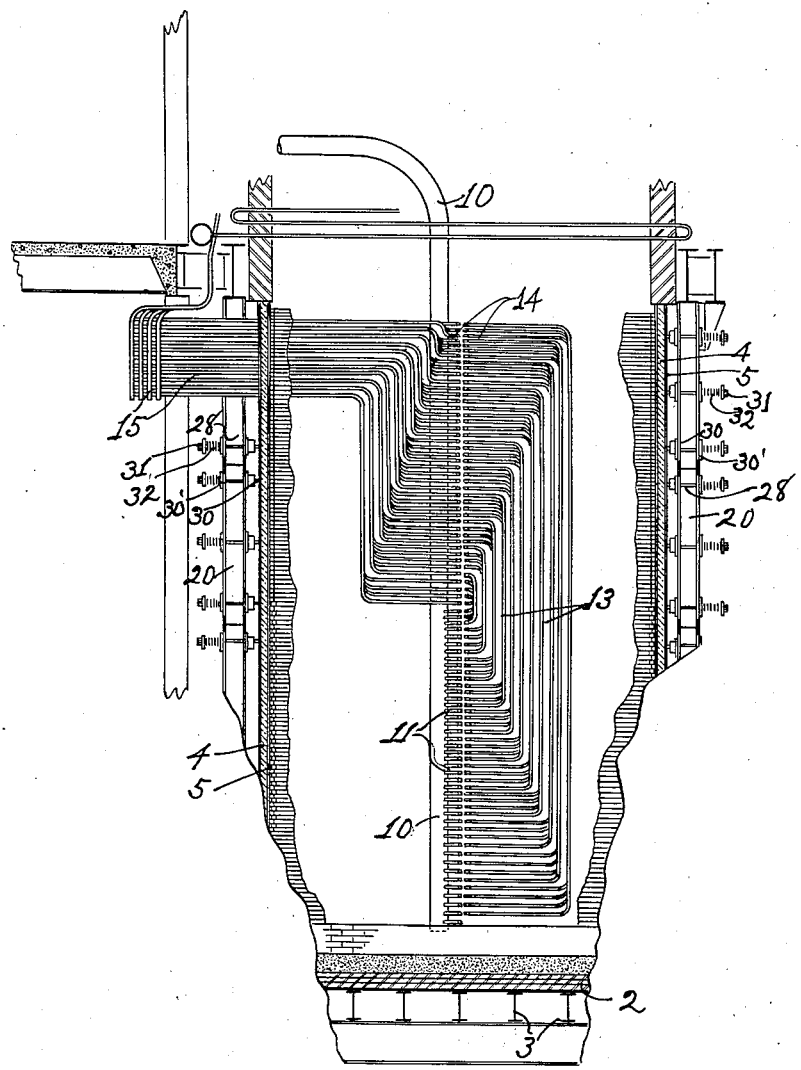
Figure 13:
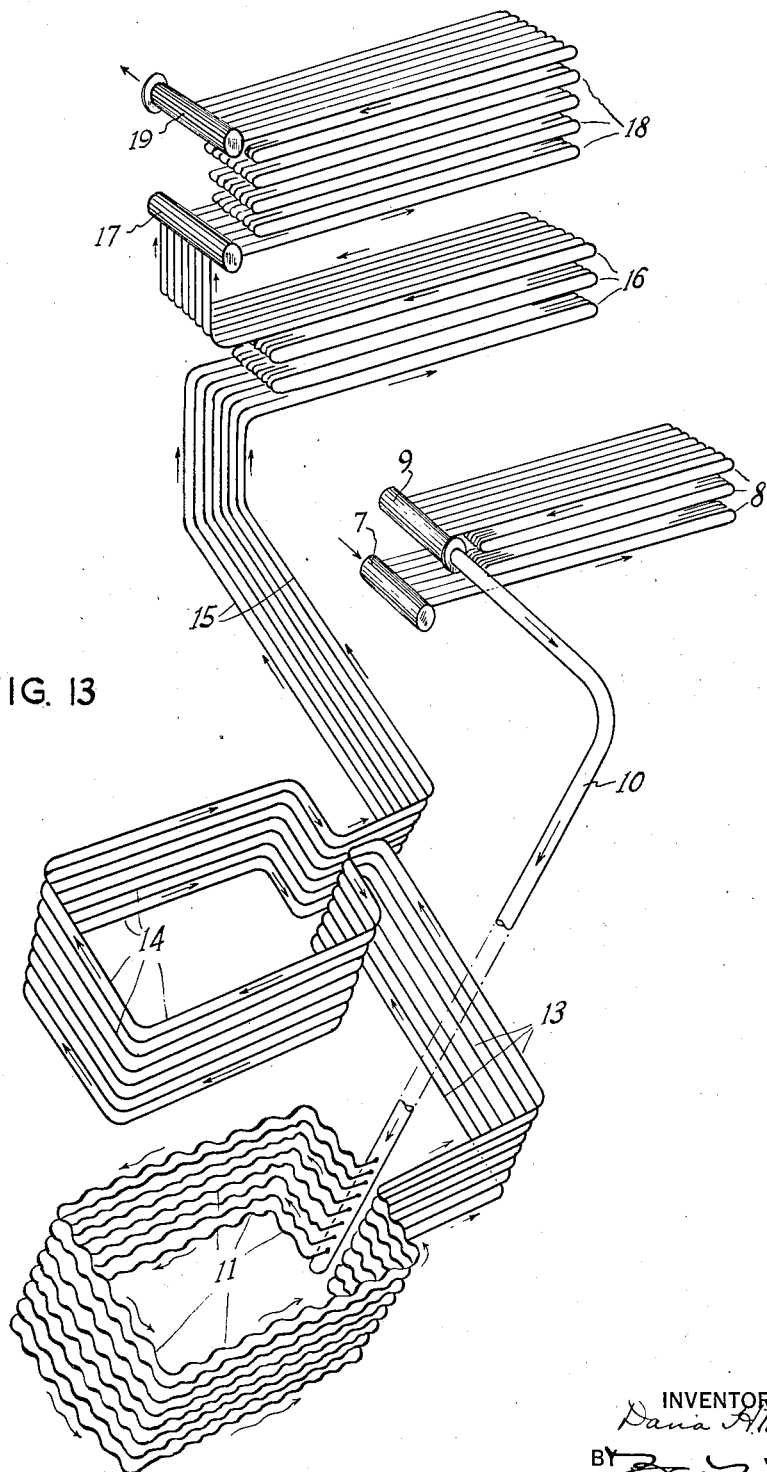

The invention will be understood from the description in connection with the accompanying drawings, in which Fig. 1 is a vertical section through an illustrative embodiment of the invention; Fig. 2 is a section along the line 2—2 of Fig. 1; Fig. 3 is a section along the line 3—3 of Fig. 1; Fig. 4 is a side view on an enlarged scale of one of the burners; Fig. 5 is a section along the line 5—5 of Fig. 4; Fig. 6 is a section along the line 6—6 of Fig. 4; Fig. 7 is a section on an enlarged scale along the line 7—7 of Fig. 2; Fig. 8 is a section along the line 8—8 of Fig. 7; Fig. 9 is a view taken along the line 9—9 of Fig. 8; Fig. 10 is a section along the line 10—10 of Fig. 9; Fig. 11 is a section along the line 11—11 of Fig. 9; Fig. 12 is a section along the line 12—12 of Fig. 3; and Fig. 13 is a diagrammatic view illustrating the fluid flow.

In the drawings, reference character 1 indicates a furnace having a floor 2 upon which molten slag may collect and be withdrawn at intervals. The floor 2 is supported upon supports 3.

The furnace walls are indicated by the reference character 4 and a casing 5 is located along the outer surfaces of the furnace walls. The outlet 6 at the top for the waste gases from the furnace leads to a stack (not shown).

A horizontally disposed header 7 is located outside of the furnace walls at the upper portion of the furnace and a row of tubes 8 in parallel extends from this header back and forth across the furnace and have their outer ends connected to a horizontally disposed header 9 outside the furnace at a higher level than the header 7. A pipe or header 10 (Figs. 1, 3 and 12) extends from one end of the header 9 horizontally to the middle of one wall of the furnace and thence vertically downwardly to the lower end of the furnace. Tubes 11 in parallel extend from the header 10 through the adjacent wall 4 of the furnace, thence horizontally around the inside walls of the furnace in an anti-clockwise direction (Fig. 2) and have their other ends extending outwardly through the same wall of the furnace through which they entered. Spacers 12 (Figs. 7, 8, 9 and 11) are placed at intervals between the tubes 11 and may be welded to the tubes. The outer ends of the tubes 11 are connected by vertical connections 13 outside of the furnace to the ends of corresponding tubes 14 which extend inwardly through the same wall of the furnace, thence horizontally around the inside walls of the furnace in a clockwise direction (Fig. 3), and thence out through the same wall of the furnace, having their outer ends connected by means of the connections 15 to the row of tubes 16 that is located above the tubes 8 and extend back and forth across the furnace, and finally into the horizontally disposed superheater inlet header 17 located near the header 9. A row of superheater tubes 18 in parallel extends from the header 17 back and forth across the furnace and enter the outlet header 19 of the superheater that may be connected to the steam mains.

The tubes 11 and 14 are preferably square in cross-section with either round or square holes through them. The tubes 14 are straight along the respective walls of the furnace and are curved into arcs at the corners of the furnace, while the tubes 11 are sinuous with curves at the corners of the furnace similar to the curves of tubes 14. The sinuosities of the tubes 11 alternate with each other in a vertical plane to provide staggered bends upon which slag from the fuel may collect and form a refractory layer which will become highly heated, thus providing high temperature in the lower portion of the furnace to promote ignition of the fuel that enters through the fuel burners. The upper portion of the furnace along which the tubes 14 are located provides a relatively smooth surface so that slag will not cling to these tubes, thus enabling the tubes 14 in the upper portion of the furnace to absorb a larger amount of heat, thus cooling the gases more than would be the case if they were covered with slag. The tubes 11 and 14 are unsupported at the corners, so that expansion and contraction can take place due to temperature changes.

Vertical buckstays 20 are located outside of the furnace walls for supporting the same. Short bars 21 (Figs. 7 and 8) are welded to the tubes 11 and 14 and are provided with slotted holes near their ends through which cross rods 22 extend. The cross rods 22 also extend through holes near the edges of plates or supporting bars 23 that are bolted together by means of the bolts 24 that pass through flanges 24' on these plates or bars. The casing 5 of the boiler is bolted to the flanges 24' by means of the bolts 25 with spacers 26 between the casing 5 and the plates 23.

The plates 23 are provided with hollow bosses 27 through which bolts 28 extend. The holes through the bosses 27 are large enough to permit the plates 23 to move transversely relative to the bolts 28 due to expansion and contraction. The bolts 28 are provided with nuts and washers 29 on the ends that extend through the bosses 27 and also with washers 29' on the other side of the bosses 27 to prevent movement of the plates 23 and furnace wall longitudinally of the bolts 28.

The bolts 28 pass through blocks 30 and 30' along opposite flanges of the I-beam buckstays 20. The outer ends of the bolts 28 are extended and have nuts and washers 31 thereon with compression springs 32 interposed between these washers and the blocks 30'.

Supporting brackets 33 extend between the plates 23 and the buckstays 20. They may rest upon a ledge or step on the lowest blocks 30 to carry the greater weight of the wall. The wall can move horizontally with respect to the bolts 28 and can expand vertically due to the slots in the bars 21. The buckstays 20 prevent the walls of the furnace from collapsing either inwardly or outwardly, although the springs 32 permit a small amount of horizontal movement.

In order to provide spaces through the furnace walls for the burners without interrupting the tubes, some of the tubes 11 are bent inwardly, as indicated at 35, to form a louver with the horizontally extending opening 36 through which the burners 37 project the fuel. The bent portions 35 of the tubes form a sloping drip ledge for slag that may run downwardly along the furnace walls. The burners 37 are indicated as being provided with elongated mouths in the opening 36 parallel to the tubes 11.

A secondary air casing 39 surrounds each opening 36 with the burners 37 extending therethrough. Each air casing 39 is spring supported from a support 40 by means of rods 41 and springs 42 (Figs. 1 and 5). Dampers 43 and access doors 44 are provided for the secondary air casing 39.

The operation is as follows: Water is forced by means of a feed pump (not shown) into the header 7, from which it passes through tubes 8 in parallel that are heated by radiant heat and convection heat to the header 9, thence to the header 10. Water then passes from the lower portion of the header 10 through the tubes 11 in parallel, and thence through the tubes 14 in parallel. The steam or mixture of steam and water from the tubes 14 passes through the connections 15 and convection heated tubes 16 into the header 17. The steam then passes through the superheater tubes 18 into the superheater outlet 19.

The fuel is projected in a downwardly inclined direction into the furnace from the burners 37 and the secondary air also passes through the openings 36 into the furnace in a downwardly inclined direction.

Very little, if any, slag collects on the tubes 14 in the upper portion of the furnace, but a layer of slag collects upon the tubes 11 in the lower portion of the furnace, keeping the same at a high temperature. The ledges or louvers 35 divert the downwardly flowing slag away from the mouths of the burners, so that it does not interfere with the entrance of the fuel or combustion air.

I claim:—

1. In a furnace, horizontally disposed sinuous wall tubes having their sinuosities alternating, a portion of said tubes being arranged so as to form a louver.

2. In a furnace, horizontally disposed wall tubes, some of said tubes being bent inwardly to a greater degree than superadjacent tubes to form a louver, and a fuel burner for projecting fuel through the opening of said louver.

3. In a furnace, horizontally disposed wall tubes, some of said tubes being bent inwardly to a greater degree than superadjacent tubes to form a louver, and a fuel burner for projecting fuel through the opening of said louver, said burner having an elongated mouth parallel to said tubes.

4. In a furnace for burning a slag-forming fuel, horizontally disposed wall tubes substantially rectangular in cross section, the tubes along the upper section of the wall being straight and sinuous along a lower section.

5. In a furnace for burning a slag-forming fuel, horizontally disposed wall tubes substantially rectangular in cross section, the tubes along one section of the wall being straight and sinuous along another section, the sinuous portions being staggered with respect to each other and having amplitudes less than the transverse dimension of said tubes.

6. In a once-through boiler having a furnace, horizontally disposed furnace wall tubes connected in parallel, and sets of tubes extending across said furnace to which opposite ends of said wall tubes are connected in series.

7. In a furnace, horizontally disposed wall tubes, some of said tubes being bent inwardly to a greater degree than superadjacent tubes to form a louver, and wide mouthed burners to project fuel into said furnace through the opening provided by said louver.

8. In a furnace, horizontally disposed wall tubes substantially rectangular in cross section, the tubes along an upper section of the wall being straight and sinuous along a lower section, the sinuosities in said tubes having amplitudes less than half their lengths, portions of adjacent sinuous tubes lying entirely between parallel planes spaced less than twice the transverse dimension of said tubes for lengths at least as long as a sinuosity.

9. In a furnace, horizontally disposed wall tubes substantially rectangular in cross section, the tubes along one section of the wall being straight and sinuous along another section, portions of adjacent sinuous tubes lying entirely between parallel planes nearer together than twice the transverse dimension of said tubes for lengths at least as long as a sinuosity.

10. In a once-through boiler, a furnace, a series of tubes through which water is changed from liquid to steam in passing once therethrough, one of said tubes being located along the lower portion of the furnace walls of said boiler, another one of said tubes being in series with said first named tube and located at a higher level along the furnace wall, another one of said tubes being in series with said first named tube and extending across the upper portion of said furnace to form part of a radiant heat screen, and a tube connected to the outlet of said second named tube and passing across the path of the hot gases from said furnace on the side of said screen opposite said furnace.

11. In a once-through boiler, a furnace, a series of tubes through which water is changed from liquid to steam in passing once therethrough, one of said tubes being located along the lower portion of the furnace walls of said boiler and passing horizontally around the inside thereof, another one of said tubes being in series with said first named tube and passing horizontally around the inside of said wall in the opposite direction and at a higher level, another one of said tubes being in series with said first named tube and extending across the upper portion of said furnace to form part of a radiant heat screen, and a tube connected to the outlet of said second named tube and passing across the path of the hot gases from said furnace on the side of said screen opposite said furnace.

12. In a boiler, a furnace, a group of tubes in parallel located along the lower portion of the walls of said furnace, a second group of tubes in parallel connected in series with said first named group located along a higher portion of said walls, a third group of tubes in parallel connected in series with said first named group extending across the upper portion of said furnace to form a radiant heat screen, and a fourth group of tubes in parallel connected to the outlet from said second group extending across the path of the hot gases from said furnace on the other side of said screen from said furnace.

13. In a furnace, a row of horizontally disposed tubes along an inside wall of said furnace, portions of a plurality of adjacent tubes of said row being bent inwardly to a greater degree than superadjacent tubes to form a downwardly and inwardly inclined slag shed.

14. In a furnace, a row of horizontally disposed tubes along an inside wall of said furnace, portions of a plurality of adjacent tubes of said row being bent inwardly to a greater degree than superadjacent tubes to form a downwardly and inwardly inclined slag shed, tubes of said row below said shed lying substantially along said wall to leave a space between them and said bent portions.

15. In a once-through boiler having a furnace, a group of tubes extending across the upper portion of said furnace, a group of radiantly heated tubes extending around the inside walls of said furnace and connected in series with said first-named group, and a group of tubes connected in series with said second-named group and extending across said furnace on the other side of said first-named group from said furnace, said tubes having a series flow therethrough in the order named.

16. In a once-through boiler having a furnace, a group of tubes extending across the upper portion of said furnace, a group of radiantly heated tubes extending around the inside walls of said furnace in the lower portion of said furnace and connected in series with said first-named group, a group of radiantly heated tubes extending around the inside walls of said furnace in the upper portion of said furnace and connected in series with said second-named group, and a group of tubes connected in series with said last-named group and extending across said furnace, said tube groups having a series flow therethrough in the order named.

17. In a furnace, horizontally disposed tubes lining a vertical wall thereof, some of said tubes being bent inwardly to a greater degree than superadjacent tubes to form a louver in said wall.

18. In a furnace, horizontally disposed sinuous wall tubes having their sinuosities alternating, the amplitude of each sinuosity being less than the transverse dimension of said tubes.

19. In a furnace of substantially rectangular cross-section, horizontally disposed sinuous tubes lining the inner side of more than one furnace wall and bent in arcs at the corners of said furnace, and means for anchoring said tubes at a point between said bent portions, whereby said tubes are left free to expand at the furnace corners.

20. In a furnace of substantially rectangular cross-section, horizontally disposed sinuous tubes of substantially rectangular cross-section lining the inner side of more than one furnace wall and bent in arcs at the corners of said furnace, and means for anchoring said tubes at a point between said bent portions, whereby said tubes are left free to expand at the furnace corners.

21. In a furnace of substantially rectangular cross-section, a horizontally disposed tube lining the inner side of more than one furnace wall and bent in an arc at each corner of said furnace, and means for anchoring said tube at a point intermediate the length of one furnace wall, whereby said tube is left free to expand at the furnace corners.

DANA H. N. MAYO.